Oct. 13, 1936.  J. EHRLICH  2,057,140

FRICTION TRANSMISSION FOR MOTOR VEHICLES

Filed May 7, 1934  2 Sheets-Sheet 2

Inventor
Jacob Ehrlich
By Blackmore, Spencer & Flint

Patented Oct. 13, 1936

2,057,140

UNITED STATES PATENT OFFICE 2,057,140

FRICTION TRANSMISSION FOR MOTOR VEHICLES

Jacob Ehrlich, Detroit, Mich., assignor to General Motors Corporation, Detroit, Mich., a corporation of Delaware Application May 7, 1934, Serial No. 724,243

4 Claims. (Cl. 74—200)

This invention relates to motor-vehicle transmission mechanism utilizing a combination of race-and-friction-roller elements susceptible of adjustment for infinitely varying the ratio of output to input speed within a limited range.

Among objects of the invention are,—to drive a motor vehicle forward by transmitting the power of the engine to the driving wheels through frictional transmission elements, but to by-pass the frictional transmission elements in reverse driving so that no torque is then transmitted through them; to enable the size and weight of the transmission mechanism to be reduced for a given power output; to simplify the problem of securing the roller supporting means to the casing; to afford ready access to the internal mechanism; to reduce losses due to churning of oil in the transmission case; and to facilitate mounting the transmission mechanism rearward of the rear axle in order to obtain superior weight distribution.

These and other useful objectives are achieved by the out-of-line arrangement of input and output shafts illustrated, which makes possible a simplified reverse mechanism disposed between engine and frictional power transmitting elements, thus shunting out the frictional elements when driving in reverse; the use of any suitable gear ratio between input and output shafts; omission of a coupling drum from input shaft or output shaft to the central race as when driving and driven shafts are alined; extending the input shaft above or below past the rear axle and gearing it back of said axle to the output shaft, the axis of which may intersect, if desired, the axis of the rear axle differential to which the output shaft is geared.

In the accompanying drawings, in which like reference characters indicate like parts throughout the several views:

Fig. 1a is a cross section showing a mounting for the front end of the differential casing;

Figure 1:
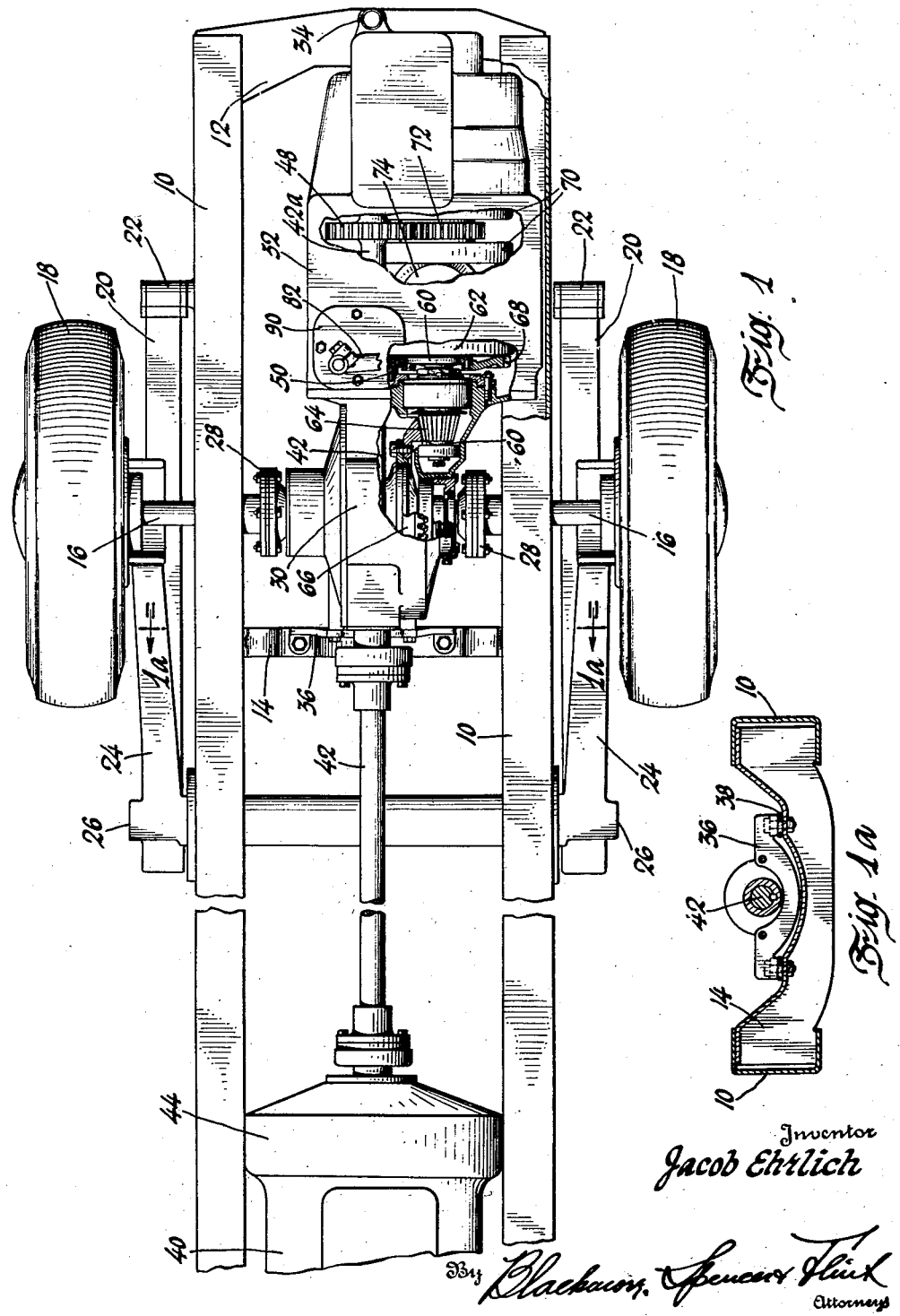
Fig. 1 is a plan view of a vehicle frame and power plant showing the relative positions of engine and transmission with respect to the frame and driving wheels as contemplated in this invention.

Referring to Fig. 1,—numeral 10 indicates the longitudinal sills of a motor vehicle frame; 12 a cross bar bridging the sills 10 at their rear ends, and 14 a cross bar bridging the sills 10 somewhat forward of the rear driving axles shown at 16. The rear portion of the frame is shown as supported on traction wheels 18 by springs 20 one end of each of which is connected as by a shackle to a sill 10 at 22, while the other end of each is bolted or otherwise rigidly connected to an arm 24 adjacent the end 26, which is pivoted to a sill 10. The free ends of arms 24 support the bearings of the outer ends of the driving axles and the traction wheels. Driving axles 16 are connected by universal joints 28 to differential mechanism within casing 30. Differential casing 30 is rigidly joined to transmission casing 32. The rear end of casing 32 has a supporting bracket 34 which rests on a rubber pad (not shown) mounted on cross member 12, while the front end of casing 30 is bolted to bracket 36 that rests upon rubber pads 38 on cross bar 14. The pad between supporting bracket 34 and cross member 12 is like pads 38. The casing structure 30, 32, therefore, has a three point cushioned support on the vehicle frame. The traction wheels are independently sprung, and are driven by floating driving axles 16 from the differential mounted on the frame as described and illustrated.

Figure 2:
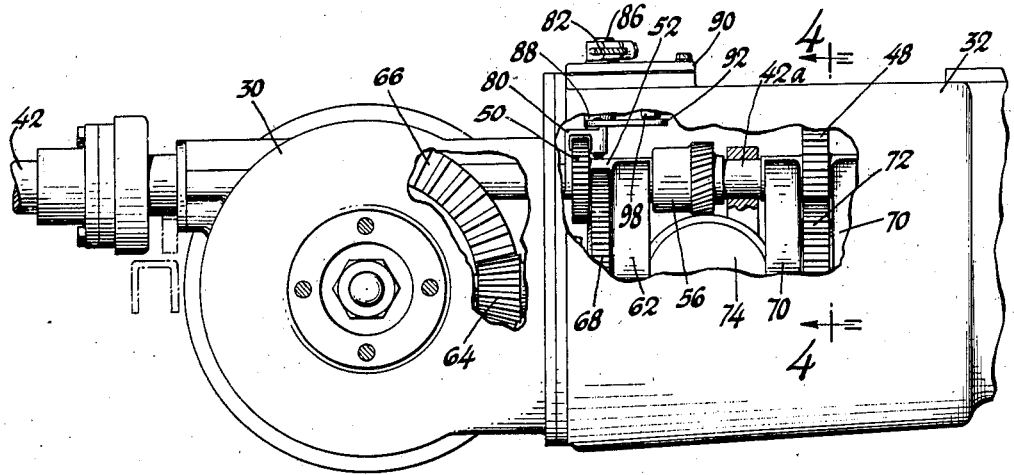
Fig. 2 is a side elevation of the differential and variable speed transmission mechanisms partly inclosed by their casings.

Referring further to Fig 1, a prime mover such as an engine 40 is mounted on the frame forward of the rear traction wheels. The engine shaft is connected to a transmission input shaft 42 by a suitable main friction clutch (not shown) within the clutch housing 44. Shaft 42 extends rearward through a bearing in the differential housing 30, above the axis of the differential gearing (as shown in Fig. 2), into the transmission housing 32.

Input shaft 42 is divided within housing 32 at 46 (Fig. 3) and continues rearward as alined shaft 42a. As shown, shaft 42a has a pilot bore in which the rear reduced end of shaft 42 is rotatably supported, and said shaft 42 and alined shaft 42a may be coupled or uncoupled at the will of the operator in order to connect or disconnect forward drive. A forward driving gear 48 is secured to shaft 42a, and a reverse driving gear 50 is splined to shaft 42. Rigid with reverse driving gear 50 is a hub 52 having a gear-like clutch member 54 on its rearward end slidable within a cylindrical coupling member 56 fixed to shaft 42a. Said coupling member 56 extends forward concentric with shaft 42, and is equipped with an internal gear-like clutch member 58 adapted to interlock with the external clutch teeth of member 54. Shafts 42 and 42a, when coupled act as one shaft for forward driving.

Output shaft 60, within casing 32, has driving connection with at least one coaxial race 62 (and preferably two), with a reverse gear 68 and a bevel pinion 64 at its front end meshing with the ring gear 66 of a differential set of suitable construction within housing 30.

The output shaft 60, as will be perceived by inspection of the drawings, is at one side (the left as shown) of the longitudinal center line of the frame, while the axis of input shaft 42, 42a is substantially in a vertical, longitudinal, central plane. Ring gear 66 of the differential is reversed from its usual position, facing away from the longitudinal center instead of toward said center. This construction allows the driving axles to be of equal length, permits the input shaft to pass above (as shown) the differential pinion cage or carrier, and the driving pinion 64 to be disposed well to one side of the center line of the frame.

Coaxial with shaft 60 and rotatable relatively to it is at least one race 70 (preferably two) coupled to a gear 72 to rotate with it, said gear 72 being constantly in mesh with driving gear 48 on input shaft continuation 42a. Between races 70 and 62 power transmitting rollers are disposed in such relation as to transmit rotary movement from race 70 to race 62. One of these power transmitting rollers is indicated by reference numeral 74 in Figs. 2 and 3. The transmission designed to be utilized is a friction transmission of the general type disclosed in patent to Hoffman #744,550 or Spencer #751,958, for examples. Any suitable controlling means for changing transmitting ratio may be utilized. As the particular friction transmission structure utilized and the controls therefor form no part of this invention they are not illustrated.

Figure 4:
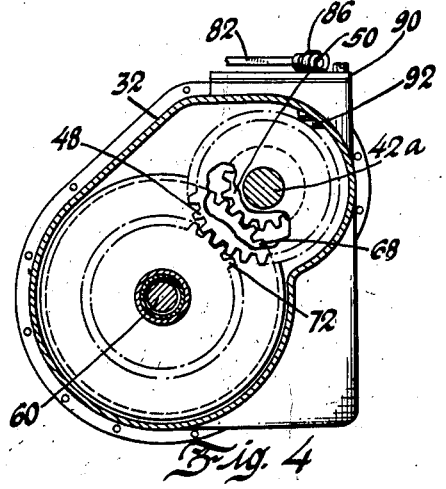
Fig. 4 is transverse section on line 4—4 of Fig. 2.

Although gears 48 and 72 are shown in Fig. 4 as provided with the same number of teeth, the parallel arrangement of input and output shafts illustrated permits of easily providing an "overdrive", by making gear 48 with a larger number of teeth than gear 72.

Figure 3:
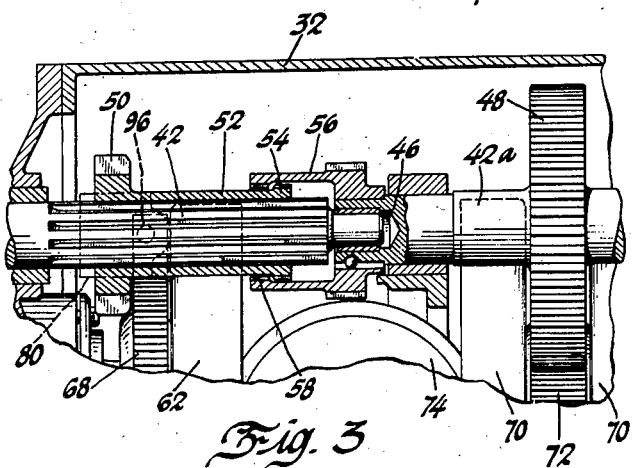
Fig. 3 is a fragmentary plan view of the main power input shaft and of elements driven thereby.

When composite gear and jaw clutch element 50—54 is in the position shown in Figs. 2 and 3, the transmission is in "neutral". It is then disconnected functionally both from the engine and the vehicle driving wheels. If this composite element 50—54 be moved one step forward (to the left as shown in Figs. 2 and 3) so as to intermesh clutch elements 54 and 58 the transmission will then be coupled both to the engine and vehicle wheels for forward driving. If from neutral position the composite element be moved one step rearward (to the right as shown in Figs. 2 and 3) then gear 50 will mesh with gear 68 on shaft 60, and engine and vehicle will be coupled in reverse, or for rearward driving. The power then flows through shaft 42, gear 50, gear 68, shaft 60, pinion 64 and differential gearing to the vehicle driving wheels. The friction transmission within casing 32 then turns in reverse without transmitting torque.

Figure 5:
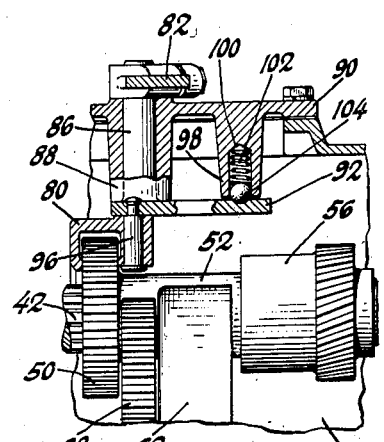
Figs. 5 and 6 are details of devices for manually connecting the engine to the vehicle wheels in forward or reverse gear or for disconnecting both forward and reverse.
Figure 6:
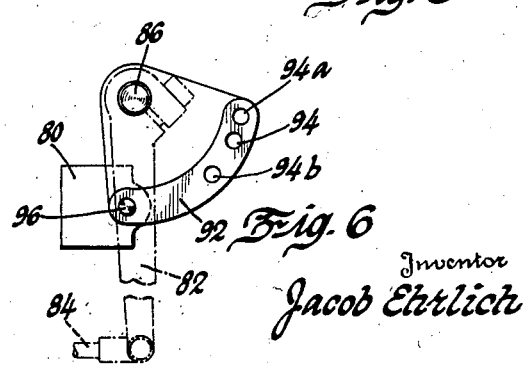

In order to enable the operator to shift from neutral to forward drive or reverse there is provided a shifter fork 80 (Figs. 2, 5, and 6) engaging composite pinion and clutch element 50—54 and operator controlled means for moving the shifter fork forward and rearward. This operator controlled means comprises a lever 82 (Figs. 1, 2, 5, and 6) moved by any suitable control device (not shown) disposed within reach of the operator and connected to the lever as by link 84 (Fig. 1). Lever 82 is secured to a shaft 86 mounted vertically and turning in a boss 88 depending from the inner side of cover plate 90 which is secured removably on casing 32. A segment 92 is fixed to lower end of shaft 86. Segment 92 is provided with three detent sockets 94, 94a and 94b, (Fig. 6) disposed in an arc in its upper side and with a pin 96 rigidly secured to its lower side at the same radial distance from the axis of shaft 86 as the sockets. A boss 98 pendent from the lower side of cover plate 90 has a hole 100 containing a coil spring 102 bearing upon a ball detent 104, which is urged by the spring into contact with segment 92, in the arc of movement of the detent sockets. When the detent engages the middle detent-socket 94 the transmission is held in neutral, gear 50 being then in the position shown in Figs. 2 and 3. If lever is moved to shift segment 92 so as to cause socket 94a to be engaged by the detent, clutch member 54 will interlock with clutch member 58 and the transmission will be coupled to drive the car forward. If lever 82 be moved oppositely so as to cause detent ball 104 to engage detent socket 94b, gear 50 will mesh with gear 68. Then the transmission will be coupled in reverse, the flow of power from the engine by-passing the friction transmission assembly, the power transmitting elements of which will rotate idly in reverse.

I claim:

1. The combination of a friction roller transmission mechanism, a power input shaft for operating said roller transmission mechanism, a power output shaft operable by the roller transmission mechanism for driving the vehicle forward, means for coupling the power input shaft to the friction transmission mechanism or uncoupling it therefrom and a disconnectible reverse gearing disposed on the input side of said coupling for driving the output shaft in reverse.

2. The combination of a transmission mechanism comprising a power input shaft and a non-alined power output shaft; driving and driven races coaxial with the power output shaft; intermediate rollers engaging the driving and driven races; forward driving gearing between the power input shaft and a driving race; reversing gearing, comprising a slidable gear on one shaft and an axially fixed gear on the other shaft; means for operatively connecting or disconnecting the forward driving gearing, said means comprising a clutch element rigid with one member of the forward driving gearing, a companion clutch element fixed to the slidable gear of the reversing gearing, and control means for sliding the composite reversing gear and clutch element so as to couple the input shaft operatively to the driving race, to uncouple the input shaft and driving race and mesh the reversing gears or to uncouple both the forward driving clutch and the reversing gears.

3. The combination of a transmission mechanism comprising a power input shaft, a power output shaft, axially alined driving and driven races coaxial with the power output shaft, the driven races having a torque transmitting connection with the power output shaft, friction rollers interposed between said races, means for coupling the power input shaft to the driving race or for uncoupling it therefrom, and disconnectible reverse gearing disposed on the power input side of said coupling between the input shaft and output shaft for driving the output shaft in reverse.

4. The combination of a transmission mechanism comprising a power input shaft, a power output shaft out of alinement with the power input shaft, driving and driven races coaxial with the power output shaft, the driven races having a torque transmitting connection with the power output shaft, friction rollers interposed between said races, means for operatively connecting or disconnecting the input shaft and driving race, reversing gearing between said shafts at the power input side of said means, and means for operatively connecting or disconnecting the reversing gearing.

JACOB EHRLICH.